United States Patent [19]
Ruck et al.

[11] Patent Number: 5,895,444
[45] Date of Patent: Apr. 20, 1999

[54] COORDINATE MEASURING APPARATUS AND METHOD FOR CONTROLLING THE SAME

[75] Inventors: Otto Ruck, Pfahlheim; Ralf Bernhardt, Aalen; Martin Wimmer, Steinheim, all of Germany

[73] Assignee: Carl-Zeiss-Stiftung, Heidenehim, Germany

[21] Appl. No.: 08/994,023

[22] Filed: Dec. 18, 1997

[30] Foreign Application Priority Data

Dec. 27, 1996 [DE] Germany ............... 196 53 912.9

[51] Int. Cl.$^6$ .................. G05B 19/19; G05B 19/4093
[52] U.S. Cl. ............... 702/168; 702/153; 364/468.24; 364/474.37; 33/503; 33/556; 33/559
[58] Field of Search ........................... 702/150, 153, 702/168; 364/468.24, 474.01, 474.37; 33/503–504, 556, 559, 561

[56] References Cited

U.S. PATENT DOCUMENTS

| | | | |
|---|---|---|---|
| 4,769,763 | 9/1988 | Trieb et al. | 33/559 |
| 4,901,256 | 2/1990 | McMurtry et al. | 702/168 |
| 4,908,951 | 3/1990 | Gurny | 33/503 |
| 5,434,803 | 7/1995 | Yoshida | 702/168 |
| 5,471,406 | 11/1995 | Breyer et al. | 702/168 |
| 5,623,766 | 4/1997 | Ruck et al. | 33/561 |
| 5,726,917 | 3/1998 | Staaden | 702/168 |
| 5,737,244 | 4/1998 | Ruck | 702/168 |
| 5,764,540 | 6/1998 | Grupp et al. | 364/474.37 |

*Primary Examiner*—John Barlow
*Assistant Examiner*—Bryan Bui
*Attorney, Agent, or Firm*—Walter Ottesen

[57] ABSTRACT

The invention is directed to a method for controlling a coordinate measuring apparatus wherein the probe head (2) and the probe pin (19) of the apparatus are control driven in accordance with desired data Pi. The probe pin (19) is movably attached to the probe head (2). In the method, the probe pin for measuring the workpiece (15) can touch down on the surface of the workpiece to be measured or can be lifted off of this surface. The speed of measurement is increased by selecting the angle ($\alpha$down, $\alpha$up) between the direction of movement $\vec{v}$res of the probe head (2) when touching down or when lifting off and the projection of the direction of movement toward the plane tangential to the workpiece surface in the touchdown/liftoff point (Pdown, Pup) to be less than 30°.

15 Claims, 3 Drawing Sheets

COORDINATE MEASURING APPARATUS AND METHOD FOR CONTROLLING THE SAME

FIELD OF THE INVENTION

The invention relates to a method for controlling a coordinate measuring apparatus wherein the probe head and the probe pin of the apparatus is control driven according to desired data. The probe pin is attached to the probe head so as to be movable. In the method, the probe pin to measure the workpiece is placed or the surface of the workpiece to be measured or is lifted from this surface. The invention also relates to a coordinate Measuring apparatus on which the method of the invention can be utilized.

BACKGROUND OF THE INVENTION

A method of the above kind is, for example, disclosed in U.S. Pat. No. 5,471,406. In this known method, the geometric data of geometric elements of the workpiece are transferred by a computer to the control system of the coordinate measuring apparatus. In the control system, the geometric data are transferred to the machine coordinate system and transmitted to an interpolator in the control system which generates the position desired values along which the probe head of the coordinate measuring apparatus is control driven. The position desired values are generated in such a manner that the probe head and the probe pin of the coordinate measuring apparatus is moved from an actual position, which lies outside of the surface of the workpiece on a straight line to the first contact point where the probe pin (that is, the probe ball attached to the probe pin) touches down on the surface of the workpiece. The probe pin deflection is so controlled that it corresponds to a preselected probe pin deflection. Thereafter, and in a next step, the measurement of the workpiece to be measured is recorded.

Particular to the method is that the probe head must first come to a complete standstill before the actual measuring operation can begin because, to measure the first contact point (that is, the start point of the measurement), a defined probe pin deflection must be set. In the same manner, the probe pin in conventional methods would be braked to a complete standstill at the end of the scanning operation and then brought via different straight line paths to the next scan point. Here too, the probe head is braked to standstill because of the transition from one straight line path to a new straight line path which is at an angle to the first straight line path.

SUMMARY OF THE INVENTION

It is an object of the invention to improve the known method so that increased measurement speeds are achieved.

The basic idea of the invention is that the probe head (or the probe pin movably mounted thereon) is guided along a path on which the probe pin can scan the entire workpiece in one pass without having to be stopped.

This affords the advantage that greatly reduced measuring times are achieved.

The invention provides that the angle between the direction of movement of the probe head when the probe pin touches down on the workpiece or when the probe pin lifts from the workpiece and the projection of the direction of movement to a plane tangent to the workpiece surface is less than 30° at the touchdown point or liftoff point. In this way, the probe pin 19 (that is, the probe ball attached thereto) can touch down directly on the workpiece surface and lift off therefrom without having to be stopped.

In addition, the basic idea of the invention is that the probe head is guided on an arcuately-shaped path (a) before the first touchdown; or
(b) between liftoff and renewed touchdown; or
(c) after the last liftoff from the workpiece surface preparatory to a change of direction. In this way, the situation is achieved that the probe head 2 does not have to of stopped or sharply braked each time in order to undertake a change in direction.

It is especially advantageous that the probe head is driven along an arcuately-shaped path:

(a) directly before touchdown; or
(b) at touchdown; or,
(c) at liftoff from the workpiece surface. This has the significant advantage especially when touching down the probe head that the probe head can be moved essentially perpendicularly toward the surface of the workpiece to be measured; whereas, shortly before touching the probe pin (or the probe ball attached thereto) down on the workpiece surface, the probe head is sharply braked in the direction which is perpendicular to the workpiece surface; whereas, the probe head can be accelerated in the direction tangential to the workpiece surface. The probe ball can then slowly land on the workpiece surface in the manner of an aircraft.

The arcuately-shaped path is preferably essentially a circularly-shaped path because a circularly-shaped path is especially easy to realize on numerically controlled coordinate measuring apparatus.

It is understood, however, that as possible paths for touchdown or liftoff even straight line paths are included which is, however, associated with the disadvantage that long approach distances must be accepted in dependence upon the normal distance of the probe ball to the surface of the workpiece to be measured as a consequence of the very low touchdown angle.

The path along which the probe head is driven for touchdown of the probe pin should, in each case, be so designed that the probe pin, during touchdown in a direction normal to the workpiece surface, is deflected relative to the probe head from its rest position so that the touchdown can be detected by the control system from the deflection of the probe pin. The value by which the probe pin is deflected from its rest position in a planned touchdown should be so dimensioned that a touchdown on a workpiece, which is not precisely positioned, is possible so that even workpieces can be contacted which are too far away.

In another embodiment of the method of the invention, the angle, which is described in detail above, can even be selected to be 0° in touchdown or in liftoff. Here, the probe head is driven parallel to the workpiece surface and the touchdown or liftoff of the probe pin from this surface is effected exclusively by the deflection of the probe pin relative to the probe head. The deflection can then, for example, be generated by measuring force generators in that the probe pin is charged with a measuring force for touchdown on the workpiece surface and this measuring force is perpendicular to the workpiece surface. For liftoff from the workpiece surface, the probe pin is charged with a measuring force which is in a direction perpendicularly away from the workpiece surface.

Brief Description of the Drawings

The invention will now be described with reference to the drawings wherein.

Description of the Preferred Embodiments of the Invention

Figure 1:
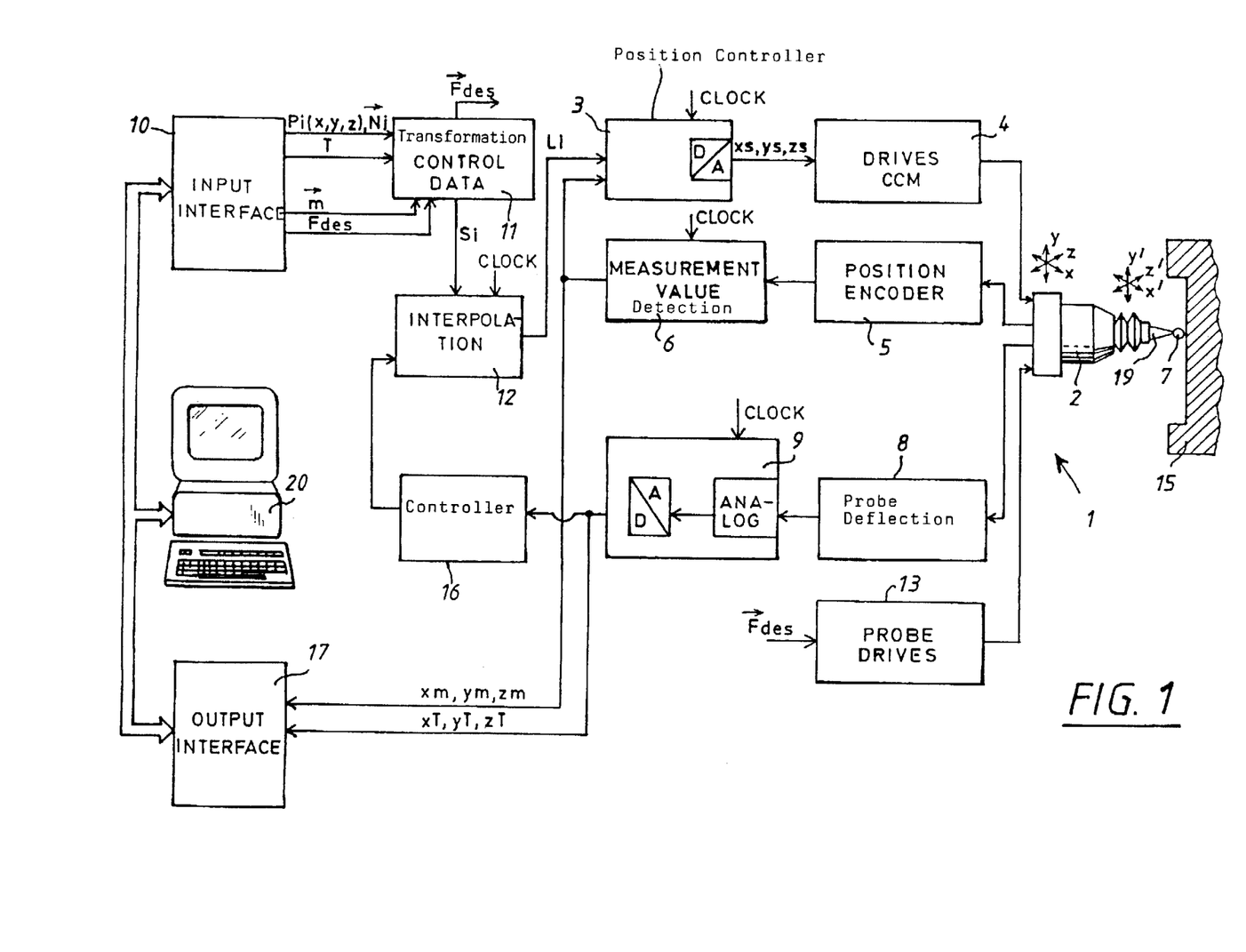
FIG. 1 is a block diagram of the control system of a coordinate measuring apparatus according to the invention and shows only the essential component groups.

FIG. 1 shows a control system 1 of a coordinate measuring apparatus of the invention. The control system 1 is described with respect to its essential component groups. The control system 1 is (connected via an input interface 10 and the output interface 17 to the evaluation computer 20 of the coordinate measuring apparatus which is not shown in detail. The following data are transferred to the control system 1 via the input interface 10 from the computer:

(a) the transformation matrix T, which defines the position of the workpiece coordinate system WKS in the machine coordinate system MKS of the coordinate measuring apparatus;

(b) the vector ($\vec{m}$ which defines the offset of the center point of the probe ball used in the machine coordinate system from a reference point on the probe head 2 of the coordinate measuring apparatus; and, (c) the magnitude of the measuring force ($\vec{F}$es) which the probe is to apply to the workpiece.

Furthermore, data are transferred via the input interface 10 which are required for defining the desired contour which is to be traveled by the probe ball 7. These are, for example, the point sequences (Pi(x, y, z)). At the same time, and insofar as available, the normal vectors ($\vec{N}$ which are assigned to the individual points (Pi(x, y, z)) on the surface of the workpiece 15 to be measured, are transferred at this location.

The most important component of the control system 1 in FIG. 1 is one or several microprocessors. Accordingly, some of the component groups shown in FIG. 1 are not realized as hardware but are instead the firmware of these microprocessors. This applies, for example, also to the component group 11 (transformation control data). The component group 11 follows the input interface 10. The function component group 11 computes the path data from the data received. The path data are the data with which the probe ball 7 is driven with respect to the workpiece 15. These path data are transferred via a coordinate transformation into the control system, that is, the machine coordinate system MKS. Details of the component group 11, via which the method of the invention is realized, are explained in greater detail with respect to FIG. 2.

In the Interpolator 12, the processed discrete path data Si, which are to be traveled, are interpolated in accordance with a pregiven algorithm (such as a linear or a spline algorithm) at the clock frequency of the control system. Position desired values Li are transferred to the downstream position controller 3 for the drives of the three measurement axes of the coordinate measuring apparatus.

The position desired values generated in the position controller 3 are then converted to analog actuating quantities which are transferred to the three drives 4 for the x, y and z axes of the coordinate measuring apparatus. Likewise, the position encoders 5 of the coordinate measuring apparatus are connected to the position controller 3 via the function component group 6 identified by the legend "measurement value detection". This component group 6 ensures a cyclical detection of the machine positions (xm, ym, zm) (that is, the positions of the probe head 2 in the machine coordinate system MKS) and closes the position control loop for the three axes of the coordinate measuring apparatus.

The control system 1 shown in FIG. 1 likewise includes the electronic block 8 entitled "probe deflection" for further processing the signals outputted by the measured-value transducers in the probe head 2. These transducers define the deflection of the probe pin 19 when the probe ball 7 contacts the workpiece 15 in the three spatial directions. The position signals, which come from these measured-value transducers, are processed in the probe-deflection unit 8 and are converted into digital values in the function component group 9. These digital output values are referred to in the following as probe-pin deflections (xT, yT, zT) and are likewise applied to the output interface 17 together with the machine positions (xm, ym, zm). These probe-pin deflections and machine positions are needed by the computer 20 for calculating the measurement result.

The control system 1 furthermore includes the drives for deflecting the probe pin in the probe head 2. These drives comprise force generators such as linear motors or solenoids. The drives deflect the probe pin 19 in response to a pregiven signal in the three spatial directions (x, y, z). The function component group 13 (probe drives) receives the data as to magnitude and direction of the measurement force $\vec{F}$es which is to be adjusted from function component group 11. The function component group 11 generates these data from the transfer data Fdes as to the magnitude of the measuring force and from the normal vector $\vec{N}$ In the case described, the direction of the measuring force $\vec{F}$es is always in the direction of the surface normal $\vec{N}$ A probe head 2 incorporating probe pin 19 is shown, for example, in U.S. Pat. No. 5,623,766 incorporated herein by reference.

In the control system, a controller 16 is provided which is connected to the output of the function component group 9 (A/D-convertEr). The probe pin deflection (xT, yT, zT) is monitored by the controller 16. If the probe pin deflection (xT, yT, zT) exceeds defined limit values, then the controller 16 switches a disturbance quantity to the interpolator 12 which displaces the position desired values Li in proportion to the probe pin deflection (xT, yT, zT) so that the probe head 2 is displaced away from the workpiece surface and the probe pin deflection (xT, yT, zT) hereby again becomes zero.

The applied measuring force $\vec{F}$es always ensures contact with the workpiece.

Further data as to the described control are presented in U.S. Pat. No. 5,471,406 incorporated herein by reference.

In the following, essential details of the component group 11 (transformation control data) are explained with respect to FIG. 2.

As mentioned above, the function component group 11 (transformation control data) receives desired data from the evaluating computer 20 which are required for computing the desired contour which is to be traveled by the probe ball 7. These data can, for example, be point sequences Pi(x, y, z) which fix the points which must be measured on the workpiece 15. The function component group 11 computes path data Si along which the probe ball 7 is to travel relative to the workpiece 15. The path data Si are (computed from the above-mentioned point sequence Pi(x, y, z). For this purpose, the path data (S1, S2, S3 . . . Sn) are generated in the function component group 11 starting from a defined start position SO over all points (P1, P2, P3 . . . Pn) of the workpiece which is to be scanned. The path data (SD . . . Sn)

are so generated by the function component group 11 (transformation control data) that:

(a) the probe pin 19 is deflected relative to the probe head 2 out of its rest position at touchdown in a direction corresponding to the normal to the workpiece surface so that a touchdown on the workpiece surface can be detected by the control system 1, even for a position deviation of the workpiece 15 from its desired position, based on the deflection (xT, yT, zT) of the probe pin 19 relative to the probe head 2;

(b) for a precise position of the workpiece 15, the probe ball 7 touches down at a defined point Pdown and lifts off at a defined point Pup from the surface of the workpiece. The point Pdown has to be so far from the first point P1 to be measured that the control system 1 has sufficient time before reaching the first point P1 to be measured to adjust a desired deflection Ades of the probe pin 19 relative to the probe head 2 even for a position deviation of the workpiece 15 out of its desired position; and, (c) the angle (αdown, αup) conjointly defined by the movement direction ves of the probe head 2 at touchdown of the probe pin 19 on the workpiece surface (or the direction of movement at liftoff of the probe pin 19 from the workpiece surface) and the projection proj of the direction of movement toward the plane tangent to the workpiece surface at the touchdown or liftoff point (Pdown, Pup) is less than 30°. The direction of movement is equivalent to the direction of the resultant path speed ves of the probe head 2 and results from the individual path velocities in the different measuring directions (vx, vy, vz).

The pate data Si generated in this manner are transferred to the interpolator 12 where they are interpolated via splines and the position desired values (L1, L2,... Ln) are generated according to which the probe ball 7 is intended to be moved. After the interpolator has transmitted the position desired values Li to the position controller 3, the probe ball 7 is moved according to the position desired values (L1, L2,..., Ln). The position desired values (L1, L2,..., Ln) are so generated that the probe head 2 can travel at machine clock frequency from position desired value Li to the next position desired value (Li+1). The resulting path velocity ves as well as the path acceleration are defined as a consequence of the arrangement of the position desired values. As shown in FIG. 2, the position desired values (L1, L2,..., Ln) are placed relatively close to each other at the start with the distance from one position desired value to the next position desired value increasing up to a maximum amount. In this way, the probe head is slowly accelerated to the final desired velocity ves.

The movement sequence of the probe ball 7 along the position desired values Li defined in this manner can be described as follows. In a first step, the probe head 2 starts from the actual position S0 in an accelerated movement normal to the surface of the workpiece 15. Starting with the support point L6, the probe head 2 begins to move over into an arcuately-shaped path directly before touchdown. This path is here configured as a circular-arc shaped path. It should be noted at this point that FIG. 2 is only a schematic representation and that the distances between the position desired values Li are actually much less so that, in contrast to FIG. 2, even a straight-line connection of the position desired values Li results in an almost circularly-shaped path.

This has as a consequence that the path velocity v of the probe head 2 (and therefore the path speed of the probe ball 7), which is directed perpendicularly to the surface of the workpiece 15 to be measured, becomes less from position desired value Li to position desired value Li+1; whereas, the velocity x in the tangential direction to the surface of the workpiece 15 continuously increases up to the desired velocity.

The probe ball 7 then touches down for the first time on the surface of the workpiece 15 in the position desired value L10 at the touchdown point Pdown. The probe head 2 is still moving in the above-mentioned arcuately-shaped path which here is configured as a circular-arc shaped path. The direction of movement of the probe head 2, and therefore also of the probe ball 7, is conjointly defined at the touchdown point Pdown by a velocity component v directed normal to the surface of the workpiece and a velocity component x directed tangentially to the surface of the workpiece. The angle αdown is between the resulting path velocity ves and the projection proj of the resulting path velocity to the plane tangential to the workpiece surface at the touchdown point Pdown. As shown in FIG. 2, this angle αdown is relatively small and is less than 30°. It should again be noted that FIG. 2 only shows the method schematically and that therefore the angle is selected close to 30° for the sake of clarity. It is especially advantageous to select the angle at about 50°.

After touchdown, the probe head 2 is moved farther toward the position desired value L1. The probe pin 19 (that is, the probe ball 7 attached thereto) is lifted by the touchdown on the workpiece surface relative to the probe head 2 and is thereby deflected. The deflection of the probe pin 19 relative to the probe head 2 is controlled out by the control system 1 in such a manner that the probe pin 19 (that is, the probe ball 7 ) exhibits a defined desired deflection Ades relative to the probe head 2. The required measured values for the points (P1, P2, P3) are recorded at the support points (L12, L13, L14) after the probe pin 19 has reached the pregiven desired deflection Ades. Because the desired deflection Ades is controlled out, only the second desired value Li after touchdown can be selected as the first point. The second position desired value Li here corresponds to the position desired value L11 in the example.

The probe head 2 (that is, the probe ball 7 attached to the probe head) moves, starting from the position desired value L14, again on an arcuately-shaped path so that the probe head 2 is moved along an arcuately-shaped path with the liftoff of the probe pin 19 from the workpiece surface. The path is here likewise configured as a circular-arc shaped path.

At the liftoff point Pup, the angle αup, conjointly defined by the resulting path velocity ves of the probe head 2 and the projection proj of the resulting path speed, is likewise less than 30° on the plane tangential to the workpiece surface at the liftoff point. The probe head 2 and the probe pin 19 attached thereto move over the position desired values L16 to L19 to the next touchdown point Pdown and from there, a measurement of the points to be measured is begun anew. The guidance of the probe head 2 between liftoff and the next touchdown on the surface should basically be so configured that at least directional changes are realized via arcuately-shaped paths, preferably, circular paths and not, as previously, via the complete stopping of the probe head and the renewed movement in another direction. The same applies to the guidance of the probe head before the first touchdown or after the last liftoff from the workpiece surface.

The method is not limited to scanning straight surfaces. The method can also be utilized in the same manner for curved surfaces.

For bores, the touchdown and liftoff can be combined with an especially advantageous scanning method. For this purpose, the probe pin 19 is guided after touchdown on the inner wall of the bore in a spiral path in the interior of the bore. After the probe pin 19 (that is, the probe ball 7 ) has reached the predetermined depth in the bore, the probe ball 7 is moved at a constant bore depth farther by 180° and from here, in the same rotational direction, is again guided spirally upwardly so that, in this way, two spirally-shaped paths are scanned which are mutually displaced by 180°. Here, the probe pin 19 (that is, the probe ball 7 attached thereto) lifts up from the surface of the inner wall of the bore and moves to the next feature to be measured.

In this way, a bore hole can be measured in a very short time. When recording the measurement values, geometric errors of the bore holes in the longitudinal direction of the bore hole axis as well as in the transverse direction of the bore hole axis can be determined in a relatively simple manner. The method can be refined in that the number of mutually opposing spirals can be increased in which the inner wall is measured.

Figure 3:
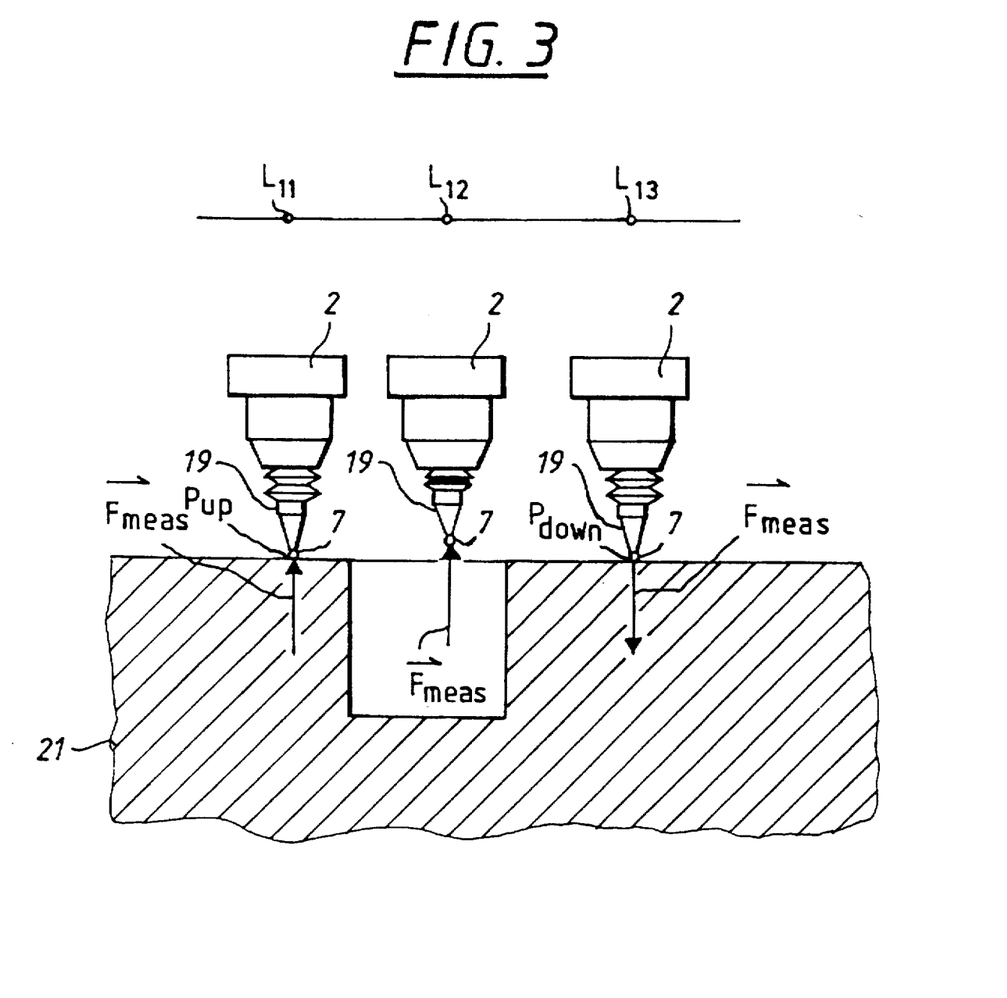

FIG. 3 shows the touchdown and the liftoff in accordance with a second embodiment of the method of the invention. Here, the workpiece 21 to be measured is shown in section and the workpiece 21 has a bore which is passed over by the ball 7 of the probe pin 19.

Figure 2:
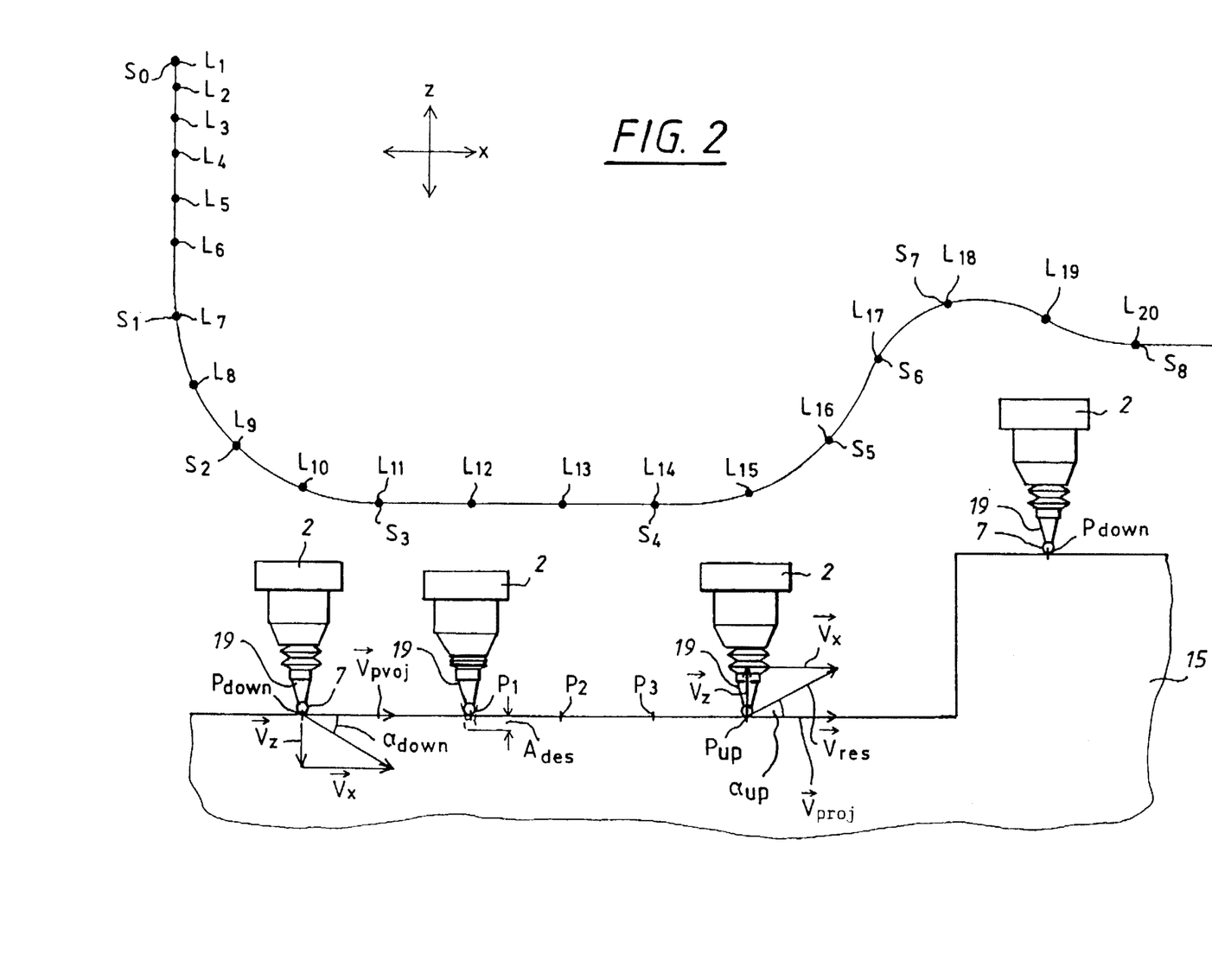
FIG. 2 is a schematic which shows the touchdown and liftoff in accordance with the method of the invention; and, FIG. 3 is a schematic which shows the touchdown and liftoff in accordance with a second embodiment of the method of the invention.

As in FIG. 2, the probe head 2 is moved along position desired values (L11 to L13) over the surface of the workpiece 21. The position desired values (L11 to L13) are only shown as a detail view.

The probe head 2 in the position desired value L11 shows schematically the probe head 2 at the liftoff point Pup. The probe pin 19 is lifted relative to the probe head 2 in order that the probe ball 7 is lifted from the workpiece surface in order to bridge the bore. This takes place with the linear drives of the function component group 13 (probe drives) in that a measuring force $F_{meas}$, which is directed away normally from the surface of the workpiece, is applied to the probe pin 19. In this way, the probe pin 19 is lifted up from the surface of the workpiece. The measuring force $F_{meas}$ is, as explained above, pregiven by the function component group 12 (interpolation) because of the measuring force Bes which is to be adjusted. It can be seen that the position desired values (L11 to L13) run parallel to the workpiece surface.

In this way, the angle between the direction of movement of the probe head 2 at liftoff and the projection of the direction of movement to the tangential plane in the liftoff point is precisely 0°, that is, likewise less than 30°. The velocity vectors and the angles at the touchdown point or at the liftoff point are not shown in FIG. 3 for reasons of clarity and result in a manner similar to FIG. 2.

The touchdown of the probe pin 19 in the position desired value L13 takes place in that, because of the measuring force Bes to be adjusted via the function component group 13 (probe drive), probe pin 19 is charged with a force $f_{meas}$ applied normal to the workpiece surface and the probe pin 19 is thereby moved toward the workpiece surface relative to the probe head 2. The course of the position desired values (L11 to L13) runs parallel to the surface of the workpiece at the touchdown point Pdown. For this reason, the angle between the direction of movement of the probe head 2 at touchdown and the projection of the direction of movement toward the tangential plane at the touchdown point is precisely 0°, that is, less than 30°.

It is understood that the foregoing description is that of the preferred embodiments of the invention and that various changes and modifications may be made thereto without departing from the spirit and scope of the invention as defined in the appended claims.

What is claimed is:

1. A method for controlling a coordinate measuring apparatus including a control system and a probe head having a probe pin movably attached thereto, the method comprising the steps of:

control driving said probe head and said probe pin in accordance with desired data (Pi) so as to cause said probe pin to touch down or lift off a surface of a workpiece to be measured; and, causing an angle ($\alpha$down, $\alpha$up) conjointly defined by the direction of movement ($v_{res}$) of said probe head at touchdown or liftoff and the projection ($v_{proj}$) of said direction of movement onto a plane tangent to said surface at the point (Pdown, Pup) of said touchdown or said liftoff to be less than 30°.

2. The method of claim 1, wherein said probe head is control driven along an arcuately-shaped path in the following situations:

(a) directly in advance of touchdown; or,
(b) at touchdown; or,
(c) at liftoff;

of said probe pin from said surface.

3. The method of claim 2, wherein said arcuately-shaped path is essentially a circular-arc shaped path.

4. The method of claim 1, wherein a position desired value after the first position desired value after touchdown is selected as a first point to be measured.

5. The method of claim 1, wherein said probe head is control driven along a path when making said touchdown; and, said path being so configured that said probe pin is deflected out of the rest position relative to said probe head during said touchdown in a direction perpendicular to said surface.

6. The method of claim 1, wherein said probe head is moved parallel to said plane during said touchdown or liftoff; and, said probe pin is deflected relative to said probe head for said touchdown or said liftoff.

7. A method for controlling a coordinate measuring apparatus including a control system and a probe head having a probe pin movably attached thereto, the method comprising the steps of:

control driving said probe head and said probe pin in accordance with desired data (Pi) so as to cause said probe pin to touchdown and liftoff of a surface of a workpiece to be measured at a plurality of points; and, guiding said probe head along an arcuately-shaped path (a) before the first touchdown; or,
(b) between liftoff and renewed touchdown; or,
(c) after the last liftoff;

from the workpiece surface preparatory to a change of direction of said probe head.

8. A coordinate measuring apparatus for measuring a workpiece having a surface, the coordinate measuring apparatus comprising:

a probe head having a probe pin movably attached thereto;

a control system for control driving said probe head in accordance with desired data (Pi) so as to cause said probe pin to touch down or lift off said surface of said workpiece;

said control system including a function component group functioning to compute a path (Si) from said desired data (Pi); and, said path (Si) being travelled by said probe head during a measuring operation of said workpiece and being computed by said function component group so as to cause an angle (αdown, αup) conjointly defined by the direction of movement (ves) of said probe head at touchdown or liftoff and the projection (proj) of said direction of movement on a plane tangent to said surface at the point (Pdown, Pup) of said touchdown or said liftoff to be less than 30°.

9. The coordinate measuring apparatus of claim 8, said path being computed by said function component group so as to cause said probe head to be driven along an arcuately-shaped path in the following situations:

(a) directly in advance of touchdown; or, (b) at touchdown; or, (c) at liftoff;

of said probe pin from said surface.

10. The coordinate measuring apparatus of claims 9, wherein said arcuately-shaped path is approximately a circular-arc shaped path.

11. The coordinate measuring apparatus of claims 8, wherein said path (Si) is so computed by said function component group that a position desired value after the first position desired value after touchdown is selected as first point (Pi) to be measured.

12. The coordinate measuring apparatus of claims 8, wherein said path is so computed by said function component group that said probe pin is deflected out of the rest position thereof relative to said probe head during said touchdown in a direction perpendicular to said surface.

13. The coordinate measuring apparatus of claims 8, wherein said path is computed by said function component group so that said probe head, during said touchdown or said liftoff, is moved parallel to a plane tangent to said surface of said workpiece at the touchdown point or the liftoff point; and, said probe pin is deflected relative to said probe head for said touchdown or said liftoff.

14. A coordinate measuring apparatus for measuring a workpiece having a surface, the coordinate measuring apparatus comprising:

a probe head having a probe pin movably attached thereto;

means for supplying desired data (Pi);

a control system for control driving said probe head in accordance with said desired data (Pi);

said control system including a function component group functioning to compute from said desired data (Pi) a path (Si) which is to be travelled by said probe head during a measuring operation of said workpiece;

said function component group being adapted to compute said path so as to cause said probe head to move on an arcuately-shaped path;

(a) before the first touchdown; or, (b) between liftoff and renewed touchdown; or, (c) after the last liftoff;

from the workpiece surface preparatory to a change of direction of said probe head.

15. The coordinate measuring apparatus of claim 14, wherein said path is computed by said function component group so that said probe head, during said touchdown or said liftoff, is moved parallel to a plane tangent to said surface of said workpiece at the touchdown point or the liftoff point; and, said probe pin is deflected relative to said probe head for said touchdown or said liftoff.

* * * * *

UNITED STATES PATENT AND TRADEMARK OFFICE
CERTIFICATE OF CORRECTION

PATENT NO. : 5,895,444
DATED : April 20, 1999
INVENTOR(S) : Otto Ruck, Ralf Bernhardt and Martin Wimmer It is certified that error appears in the above-identified patent and that said Letters Patent is hereby corrected as shown below:

In the Title Page, under "Foreign Application Priority Data": delete "December 27, 1996" and substitute -- December 21, 1996 -- therefor.

In the Title Page, in the Abstract, line 10: delete "vres" and substitute -- $\bar{v}res$ -- therefor.

In column 1, line 13: delete "Measuring" and substitute -- measuring -- therefor.

In column 2, line 8: delete "of" and substitute -- be -- therefor.

In column 3, line 12: delete "(connected" and substitute -- connected -- therefor.

In column 3, line 22: delete "(m)" and substitute -- $(\bar{m})$ -- therefor.

In column 3, line 24: delete "(Fdes)" and substitute -- $(\bar{F}des)$ -- therefor.

In column 3, line 33: delete "(N)," and substitute -- $(\bar{N}i)$, -- therefor.

In column 3, line 52: delete "Interpolator" and substitute -- interpolator -- therefor.

UNITED STATES PATENT AND TRADEMARK OFFICE
CERTIFICATE OF CORRECTION

PATENT NO. : 5,895,444
DATED : April 20, 1999
INVENTOR(S) : Otto Ruck, Ralf Bernhardt and Martin Wimmer It is certified that error appears in the above-identified patent and that said Letters Patent is hereby corrected as shown below:

In column 4, line 26: delete "Fdes" and substitute -- $\overline{Fdes}$ -- therefor.

In column 4, line 30: delete "(N)." and substitute -- $(\overline{Ni})$. - therefor.

In column 4, line 31: delete "Fdes" and substitute -- $\overline{Fdes}$ -- therefor.

In column 4, line 32: delete "(N)" and substitute -- $(\overline{Ni})$. -- therefor.

In column 4, line 38: delete "(A/D-convertEr)." and substitute -- (A/D-converter) -- therefor.

In column 4, line 47: delete "Fdes" and substitute -- $\overline{Fdes}$ -- therefor.

In column 5, line 21: delete "vres" and substitute -- $\overline{vres}$ -- therefor.

In column 5, line 26: delete "vproj" and substitute -- $\overline{vproj}$ -- therefor.

In column 5, line 30: delete "vres" and substitute -- $\overline{vres}$ -- therefor.

In column 5, line 33: delete "pate" and substitute -- path -- therefor.

UNITED STATES PATENT AND TRADEMARK OFFICE
CERTIFICATE OF CORRECTION

PATENT NO. : 5,895,444  
DATED : April 20, 1999  
INVENTOR(S) : Otto Ruck, Ralf Bernhardt and Martin Wimmer Page 3 of 5

It is certified that error appears in the above-identified patent and that said Letters Patent is hereby corrected as shown below:

In column 5, line 44: delete "vres" and substitute -- $\bar{v}res$ -- therefor.

In column 5, line 52: delete "vdes." and substitute -- $\bar{v}des.$ -- therefor.

In column 5, line 58: delete "heaid 2" and substitute -- head 2 -- therefor.

In column 5, line 66: delete "vz" and substitute -- $\bar{v}z$ -- therefor.

In column 6, line 4: delete "vx" and substitute -- $\bar{v}x$ -- therefor.

In column 6, line 14: delete "vz" and substitute -- $\bar{v}z$ -- therefor.

In column 6, line 16: delete "vx" and substitute -- $\bar{v}x$ -- therefor.

In column 6, line 18: delete "vres" and substitute -- $\bar{v}res$ -- therefor.

In column 6, line 19: delete "vproj" and substitute -- $\bar{v}proj$ -- therefor.

In column 6, line 26: delete "50°" and substitute -- 5° -- therefor.

UNITED STATES PATENT AND TRADEMARK OFFICE
CERTIFICATE OF CORRECTION

Page 4 of 5

PATENT NO. : 5,895,444
DATED : April 20, 1999
INVENTOR(S) : Otto Ruck, Ralf Bernhardt and Martin Wimmer It is certified that error appears in the above-identified patent and that said Letters Patent is hereby corrected as shown below:

In column 6, line 28: delete "L1" and substitute -- L11 -- therefor.

In column 6, line 51: delete "vres" and substitute -- $\bar{v}res$ -- therefor.

In column 6, line 52: delete "vproj" and substitute -- $\bar{v}proj$ -- therefor.

In column 7, line 19: delete "holes" and substitute -- hole -- therefor.

In column 7, line 40: delete "Fmeas" and substitute -- $\bar{F}meas$ -- therefor.

In column 7, line 44: delete "Fmeas" and substitute -- $\bar{F}meas$ -- therefor.

In column 7, line 46: delete "Fdes" and substitute -- $\bar{F}des$ -- therefor.

In column 7, line 59: delete "Fdes" and substitute -- $\bar{F}des$ -- therefor.

In column 7, line 61: delete "drive)" and substitute -- drives) -- therefor.

In column 7, line 61: delete "Fmeas" and substitute -- $\bar{F}meas$ -- therefor.

UNITED STATES PATENT AND TRADEMARK OFFICE
CERTIFICATE OF CORRECTION

PATENT NO. : 5,895,444
DATED : April 20, 1999
INVENTOR(S) : Otto Ruck, Ralf Bernhardt and Martin Wimmer It is certified that error appears in the above-identified patent and that said Letters Patent is hereby corrected as shown below:

In column 8, line 19: delete "vres" and substitute -- $\bar{v}res$ -- therefor.

In column 8, line 20: delete "vproj" and substitute -- $\bar{v}proj$ -- therefor.

In column 9, line 9: delete "vres" and substitute -- $\bar{v}res$ -- therefor.

In column 9, line 10: delete "vproj" and substitute -- $\bar{v}proj$ -- therefor.

In column 9, line 21: delete "liftoff;" and substitute -- liftoff -- therefor.

In column 10, line 22: delete "path;" and substitute -- path -- therefor.

In column 10, line 25: delete "liftoff;" and substitute -- liftoff -- therefor.

Signed and Sealed this

Eighth Day of May, 2001

*Attest:*

*Attesting Officer*

NICHOLAS P. GODICI

*Acting Director of the United States Patent and Trademark Office*